United States Patent
Bauch et al.

(10) Patent No.: US 6,553,295 B1
(45) Date of Patent: Apr. 22, 2003

(54) SYSTEM FOR SENSING A SIDE IMPACT COLLISION

(75) Inventors: David J. Bauch, South Lyon, MI (US); Joseph Robert Brown, Grosse Ile, MI (US); Mark Anthony Cuddihy, New Boston, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/694,911

(22) Filed: Oct. 24, 2000

(51) Int. Cl.$^7$ ............................... G06F 7/00; G05D 1/00
(52) U.S. Cl. ........................... 701/45; 701/36; 701/46; 280/734; 280/735; 280/730.2; 180/282
(58) Field of Search ........................... 701/45, 46, 36; 280/734, 735, 730.2, 732, 728.3, 728.1, 728.2; 180/271, 282, 274, 268; 307/10.1

(56) References Cited

U.S. PATENT DOCUMENTS

| | | | |
|---|---|---|---|
| 4,836,024 A | | 6/1989 | Woehrl et al. ............. 307/10.1 |
| 5,173,614 A | | 12/1992 | Woehrl et al. ............. 307/10.1 |
| 5,194,755 A | * | 3/1993 | Rhee et al. ................ 307/10.1 |
| 5,202,831 A | | 4/1993 | Blackburn et al. ............ 701/46 |
| 5,222,761 A | * | 6/1993 | Kaji et al. ................ 280/730.2 |
| 5,338,062 A | | 8/1994 | Kiuchi et al. ............... 280/735 |
| 5,428,534 A | | 6/1995 | Wetzel et al. ................. 701/46 |
| 5,484,166 A | | 1/1996 | Mazur et al. ............. 280/730.2 |
| 5,504,379 A | * | 4/1996 | Mazur et al. ............... 180/282 |
| 5,609,358 A | | 3/1997 | Iyoda et al. ................. 280/735 |
| 5,623,246 A | * | 4/1997 | Kruse et al. ................. 180/274 |
| 5,746,444 A | | 5/1998 | Foo et al. .................... 280/735 |
| 5,749,059 A | * | 5/1998 | Walton ....................... 280/735 |
| 5,756,948 A | * | 5/1998 | Husby et al. ............. 200/61.53 |
| 5,758,899 A | | 6/1998 | Foo ......................... 280/730.2 |
| 5,767,766 A | | 6/1998 | Kwun ........................ 340/436 |
| 5,785,347 A | * | 7/1998 | Adolph et al. .............. 180/273 |
| 5,793,005 A | * | 8/1998 | Kato .......................... 180/282 |
| 5,899,949 A | * | 5/1999 | Kincaid ........................ 701/45 |
| 5,900,807 A | * | 5/1999 | Moriyama et al. .......... 340/436 |
| 5,916,289 A | * | 6/1999 | Fayyad et al. .............. 180/232 |
| 5,967,548 A | * | 10/1999 | Kozyreff ...................... 180/282 |
| 6,095,553 A | * | 8/2000 | Chou et al. ................. 280/735 |
| 6,095,554 A | * | 8/2000 | Foo et al. ................. 280/730.2 |
| 6,157,880 A | * | 12/2000 | de Mersseman et al. ..... 701/45 |
| 6,167,335 A | * | 12/2000 | Ide et al. ...................... 701/45 |
| 6,282,474 B1 | * | 8/2001 | Chou et al. ................... 701/45 |

* cited by examiner

Primary Examiner—Jacques H. Louis-Jacques
(74) Attorney, Agent, or Firm—Gary A. Smith

(57) ABSTRACT

A side impact collision sensing system 10 for use on a vehicle 12. System 10 includes several door mounted impact sensors 18–24 and a sensor 26 which is disposed in relative close proximity to the center of the vehicle's passenger compartment 52. System 10 determines whether a side impact collision has occurred or is occurring and selectively activates one or more restraint assemblies 28–34 if such a determination is made. System 10 reduces the likelihood of a false and/or unnecessary activation of restraint assemblies 28–34 by using sensors 18–24 and sensor 26 in a distributed algorithm to detect side impact collisions.

16 Claims, 4 Drawing Sheets

SYSTEM FOR SENSING A SIDE IMPACT COLLISION

FIELD OF THE INVENTION

This invention relates to a system for sensing a side impact collision and, more particularly, to a system which reliably determines when a side impact collision has occurred and which activates one or more vehicle safety devices in response to such a determination.

BACKGROUND OF THE INVENTION

Safety devices, such as front and side inflatable restraint assemblies or "air bags", are used to reduce the likelihood of injury to occupants of the vehicle in the event of a vehicle collision. In order to properly protect the occupants of the vehicle, it is desirable to accurately detect a collision so that these safety devices can be engaged or deployed in an appropriate and timely manner.

For example and without limitation, inflatable restraint assemblies, commonly referred to as "air bags" or "curtains", are typically deployed within a vehicle and selectively and inflatably expand into the passenger compartment when the vehicle is struck by or collides with another vehicle or object. One type of inflatable restraint assembly, commonly referred to as a "side air bag", is contained within the seats, doors or sides of the vehicle and is designed to deploy in the event of a relatively severe side impact or collision. Particularly, these expandable assemblies substantially protect the vehicle occupants from injury by substantially preventing the occupants from impacting or "crashing into" the side and/or various other portions of the vehicle.

Efforts have been made to detect or sense when a side impact or collision has occurred, and to activate the appropriate safety devices (e.g., the side air bags) upon such detection. Some prior efforts include disposing acceleration sensors in the vehicle's doors and measuring and/or monitoring the "lateral" acceleration of each of the doors.

Other systems have utilized a "single-point" sensor mounted within the passenger compartment and remote from the doors of the vehicle to detect side impact collisions.

Applicants' invention improves upon the previous systems by providing a system for sensing a side impact collision which employs multiple sensors to gather data relating to the acceleration of the vehicle, which analyzes the data to determine whether a side impact collision has occurred, and which selectively and reliably activates one or more vehicle safety devices in response to the detection of a side impact collision.

SUMMARY OF THE INVENTION

It is a first object of the invention to provide a system for sensing a side impact collision which utilizes multiple sensors to determine whether a side impact collision has occurred or is occurring.

It is a second object of the invention to provide a system for sensing a side impact collision which reliably detects a side impact collision and which selectively activates one or more vehicle safety devices in response to such a detection.

According to one aspect of the present invention a system is provided for detecting a side impact collision to a vehicle and for activating a safety device in response to the detection. The vehicle includes at least one door and a passenger compartment. The system includes at least one first sensor which is mounted to the door, which measures a first lateral acceleration value, and which generates a first signal representing the measured first lateral acceleration value; at least one second sensor which is mounted within the passenger compartment, which measures a second lateral acceleration value, and which generates a second signal representing the measured second lateral acceleration value; a selectively activatable safety device; and a controller communicatively coupled to the at least one first sensor, to the at least one second sensor, and to the selectively activatable safety device, the controller being effective to receive the first signal and the second signal, and based upon the first signal and the second signal, to detect whether a side impact collision has occurred and to selectively activate the safety device in response to the detection.

According to a second aspect of the invention, a method is provided for sensing a side impact collision to a vehicle having a plurality of doors and a passenger compartment. The method includes the steps of providing at least one first sensor disposed at a unique one of the plurality of doors; providing at least one second sensor disposed within the passenger compartment; providing at least one inflatable restraint assembly; and monitoring the at least one first sensor and the at least one second sensor to determine whether a side collision is occurring, and selectively activating the at least one inflatable restraint assembly in response to the determination.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
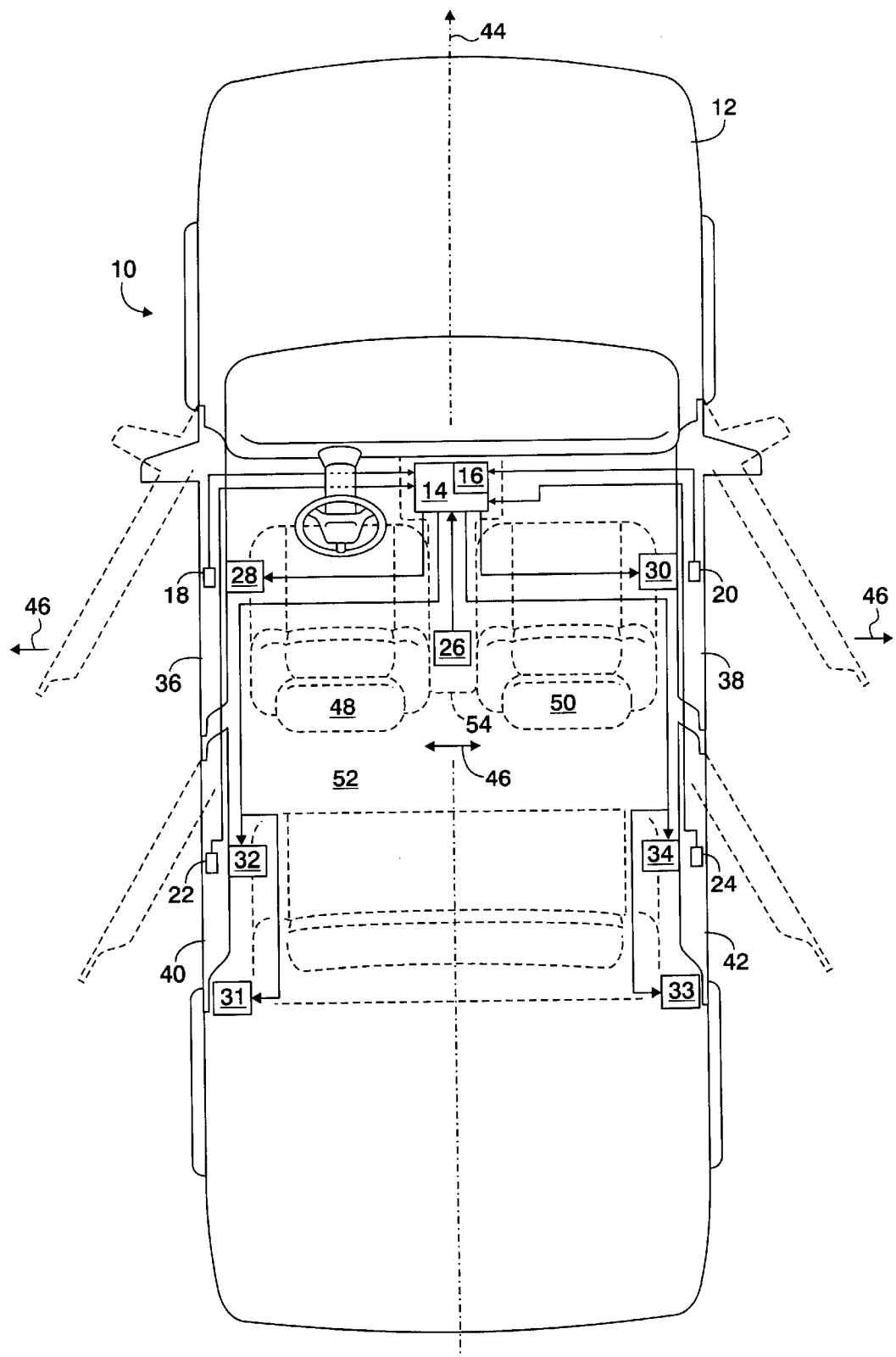
FIG. 1 is a block diagram of a system for sensing a side impact collision which incorporates the teachings of the preferred embodiment of the invention and which is deployed on a vehicle.

Referring now to FIG. 1, there is shown a side impact collision sensing system, assembly or apparatus 10 which is deployed on a vehicle 12 and which is made in accordance with the teachings of the preferred embodiment of the invention. As shown, apparatus 10 includes a conventional microprocessor, microcontroller or controller 14 having a memory unit 16 and operating under stored program control. Controller 14 is electrically and communicatively coupled to impact sensors 18, 20, 22, and 24 which are respectively mounted to the doors 36, 38, 40 and 42 of vehicle 12. Controller 14 is further electrically and communicatively coupled to a sensor 26 which is disposed within the passenger compartment 52 of vehicle 12, and to vehicle occupant safety devices or assemblies 28, 30, 31, 32, 33 and 34. As described more fully and completely below, controller 14 receives signals generated by sensors 18–26, processes and utilizes the received signals to determine whether a side impact collision to the vehicle 12 is occurring or has occurred, and selectively activates safety devices 28–34, if such a determination is made, thereby protecting the vehicle's occupants from harm and/or injury.

In the preferred embodiment, controller 14 is mounted within or in relative close proximity to the "tunnel" portion 54 of the passenger compartment 52 (e.g., between front seats 48, 50). Controller 14 is a conventional controller and may include one or more microprocessors and/or integrated circuits which control the operation of system 10. In the preferred embodiment of the invention, memory unit 16 is a conventional memory unit including both permanent and temporary memory, and is adapted to and does store at least a portion of the operating software and/or crash detection algorithms which direct the operation of controller 14. Memory 16 is also adapted to selectively store other types of data or information, including information associated with the operation of the preferred embodiment of the invention and/or associated historical data, processing data, and/or operational data. As should also be apparent to those of ordinary skill in the art, controller 14 and memory 16 may actually comprise a plurality of commercially available, conventional, and disparate chips or devices which are operatively and communicatively linked in a cooperative manner.

Each of sensors 18–24 comprises a conventional and commercially available door-mounted impact sensor (e.g., an accelerometer or other door mounted sensing device such as a crush type sensor) which measures certain information pertaining to the acceleration of the respective door 36–42 on which the sensor is mounted. In the preferred embodiment, each sensor 18–24 is respectively mounted in relative close proximity to the "center" or the "rear" of each door 36–42. In the preferred embodiment of the invention, sensors 18–24 measure the "lateral" acceleration of each of the respective doors 36–42 (i.e., the acceleration along the "Y-axis" or in the directions of arrows 46 which are substantially perpendicular to the longitudinal axis 44 of vehicle 12) or the amount or rate of crush. Sensors 18–24 provide data representing the measured values to controller 14, which utilizes these values to determine the "lateral" or "Y-axis" acceleration of each of the doors 36–42. As described more fully and completely below, controller 14 utilizes these values along with data from sensor 26 in a "distributed" crash prediction algorithm to determine whether the measured "lateral" or "Y-axis" acceleration or "severity" is consistent with a side impact collision occurring at one or more of the doors 36–42 and determines whether the inflation of any of devices 28–34 is required.

In one non-limiting embodiment, each sensor 18–24 includes a self-contained controller which analyzes the measured acceleration of each of the respective doors 36–42, which determines whether the measured "lateral" or "Y-axis" acceleration or "severity" is consistent with a "door" collision (e.g., a collision which impacts or crushes one or more of the vehicle's doors 36–42), and which communicates a signal to controller 14 if a "door" collision is detected. Controller 14 analyzes the generated signal along with data from sensor 26 to determine whether the deployment of any of air bags 28–34 is required.

In other alternate embodiments, sensors 18–24 comprise other types of impact sensors, such as mechanical switch-type sensors or structural deformation or stress sensors, which are adapted to detect the structural deformation and/or stress accompanying a side impact collision. It should be appreciated that sensors 18–24 may include filtering and/or processing devices or circuits which filter and/or process their respective measured data prior to sending the data to controller 14.

In the preferred embodiment of the invention, sensor 26 is mounted in relative close proximity to the center of the passenger compartment 52 (e.g., within the "tunnel" portion 54 between seats 48 and 50 and/or within controller 14) and comprises a conventional and commercially available accelerometer. Sensor 26 measures the "lateral" acceleration (i.e., acceleration along the "Y-axis" or in the directions 46 which are substantially perpendicular to the longitudinal axis 44 of vehicle 12) of the vehicle 12. Sensor 26 provides data representing the measured acceleration values to controller 14, which utilizes these values to determine the "lateral" or "Y-axis" acceleration of the vehicle 12. In one non-limiting embodiment, sensor 26 includes a self-contained controller which analyzes the measured acceleration, and which determines whether the measured "lateral" or "Y-axis" acceleration is consistent with a "deployment" type side collision (e.g., a side collision which is severe enough to warrant the deployment of one or more air bags 28–34) or a "non-deployment" type side collision (e.g., a side collision which is not severe enough to warrant the deployment of one or more air bags 28–34), and which communicates a signal to controller 14. Sensor 26 may include filtering and/or processing devices or circuits which filter and/or process the measured data prior to sending the data to controller 14.

Safety devices or restraint assemblies 28–34 each comprise one or more conventional and commercially available side impact inflatable restraint assemblies or side impact "air bags", and are disposed within and/or around the passenger compartment 52 of vehicle 12. Assemblies 28–34 may further include one or more conventional seat belt pretensioning assemblies. Assemblies 28–34 are selectively activated in response to the receipt of one or more command or control signals from controller 14.

Figure 2:
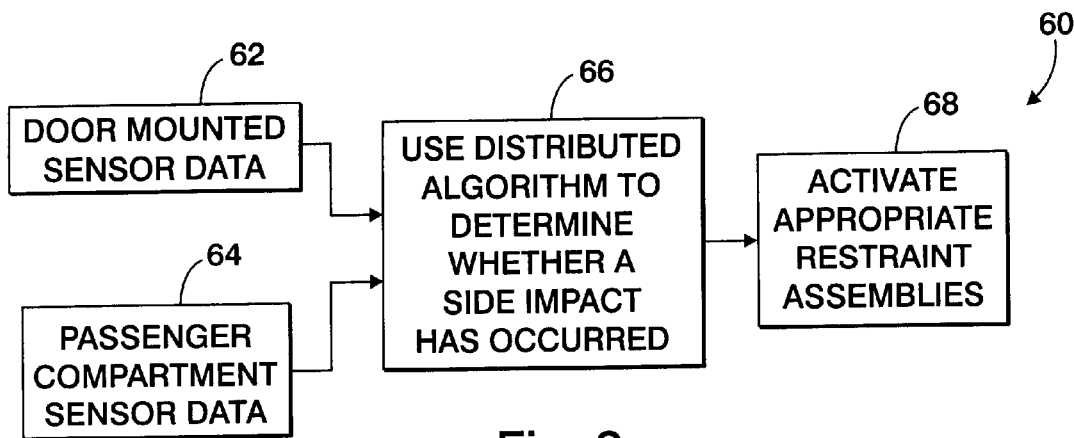
FIG. 2 is a block diagram illustrating the general functionality of the system shown in FIG. 1.

In the preferred embodiment of the invention, the operative functionality of the system is achieved by the use of certain software and/or firmware operatively stored within system 10 and more particularly within memory unit 16 and/or within controller 14. To understand the general operation of system 10, reference is now made to flow chart or diagram 60 of FIG. 2, illustrating the broad functionality of system 10.

Data 62 represents data received from door-mounted sensors 18–24. Data 62 contains information relating to the measured acceleration or structural deformation of each the vehicle's doors 36–42, which may be indicative of or correspond to a side impact collision. Controller 14 monitors and/or receives data 62, and processes data 62 to determine whether a "door collision" (i.e., a collision which crushes/impacts one or more of doors 36–42) has occurred or is occurring. Particularly, controller uses this data 62 in conjunction with data 64 from sensor 26 to determine whether an object has struck or impacted any of the doors 36–42 of vehicle 12, and if so, whether the collision is severe enough to warrant a deploying or activating any one or more of restraint assemblies 28–34.

Data 64 represents the lateral or "Y-axis" acceleration of the vehicle 12, measured at a location in general proximity to the center of the passenger compartment 52 by sensor 26. Controller 14 monitors and/or receives data 64, and processes data 64 to determine whether a collision has occurred or is occurring. Particularly, using conventional algorithms, controller 14 determines whether an object, such as another vehicle, has struck or impacted vehicle 12, and if so, whether the collision is severe enough to warrant a deploying or activating any one or more of restraint assemblies 28–34.

As illustrated in block 66 and as discussed more fully and completely below, controller 14 utilizes a "distributed" algorithm (e.g., analyzes both data 62 and data 64) to determine whether a side impact collision has occurred or is occurring and whether the collision is severe enough to warrant or require the activation or deployment of any of restraint assemblies 28–34. If controller 14 determines that the activation or deployment of any of restraint assemblies 28–34 is necessary, controller 14 communicates a signal to any one or more of the assemblies 28–34, thereby activating the assemblies and protecting the occupants of vehicle 12, as shown in block 68. In order to better understand the operation and/or deployment decision-making process of controller. 14, reference now made to FIGS. 3 through 6 which illustrate various deployment and non-deployment decisions made by controller 14.

Figure 3:
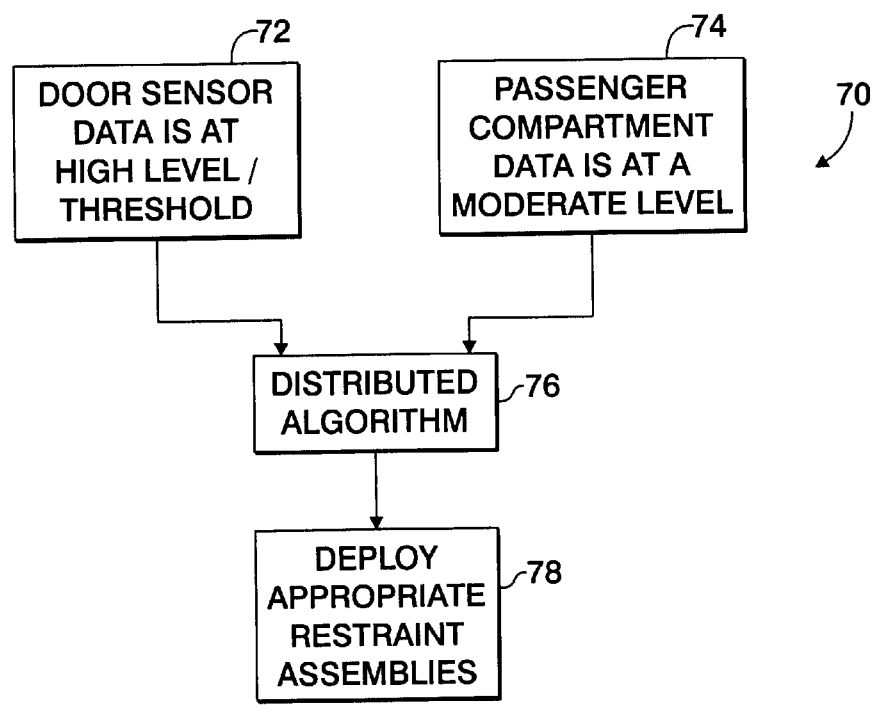
FIG. 3 is a block diagram illustrating a first type of deployment decision made by the system shown in FIG. 1.

Referring now to FIG. 3, there is shown a flow chart or flow diagram 70 illustrating a deployment decision made by the "distributed" algorithm performed by controller 14. As shown in functional block or step 72, controller 14 receives data from "door-mounted" sensors 18–24 (e.g., data 62) which corresponds to a high level of acceleration (e.g., acceleration measurements exceeding or approaching a predetermined "high" threshold value) which is indicative or representative of a side impact collision that is localized at one or more of the respective doors 36–42. 42. In functional block or step 76, controller 14 analyzes the data 72 in combination with data from sensor 26 (i.e., data 64) in order to more accurately make a deployment/non-deployment decision. As shown in functional block or step 74, in this non-limiting example, the data from sensor 26 corresponds to a moderate level or value of lateral acceleration measured within the passenger compartment 52. In the preferred embodiment of the invention, after receiving a high acceleration value or "deployment" signal from one or more of sensors 18–24, controller 14 further ensures that the passenger compartment acceleration data (e.g., data 64) meets a moderate or lower threshold level or value prior to deploying any of restraint assemblies 28–34. In one non-limiting embodiment, this moderate or lower threshold level is a dynamic threshold value (e.g., the threshold value is a function of the acceleration values measured by sensors 18–24). As illustrated by functional block or step 78, the moderate acceleration value measured by sensor 26 and the high acceleration value(s) measured by sensors 18–24 results in the deployment of one or more of assemblies 28–34 (e.g., controller 14 communicates a signal to any one or more of the assemblies 28–34, thereby activating the assemblies and protecting the occupants of vehicle 12).

Figure 4:
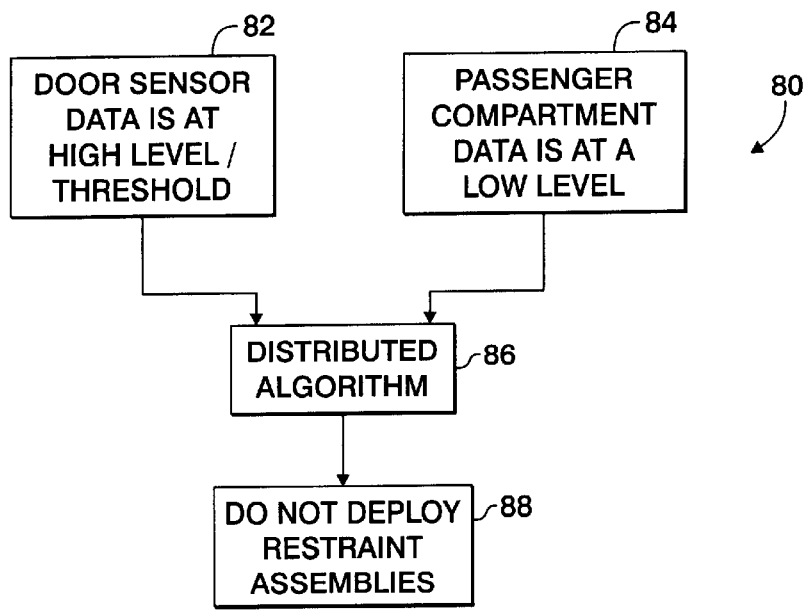
FIG. 4 is a block diagram illustrating a first type of non-deployment decision made by the system shown in FIG. 1.

Referring now to FIG. 4, there is shown a flow chart or flow diagram 80 illustrating a non-deployment decision made by the "distributed" algorithm performed by controller 14. As shown in functional block or step 82, controller 14 receives data from "door-mounted" sensors 18–24 (e.g., data 62) which corresponds to a high level of acceleration (e.g., acceleration measurements exceeding or approaching a predetermined "high" threshold value) which is indicative or representative of a side impact collision that is localized at one or more of the respective doors 36–42. In functional block or step 86, controller 14 analyzes the data from sensors 18–24 in combination with data from sensor 26 (i.e., data 64) in order to accurately make a deployment/non-deployment decision. As shown in functional block or step 84, the data from sensor 26 corresponds to a low level or value of lateral acceleration measured within the passenger compartment 52. In this non-limiting example, the data from sensor 26 (e.g., data 64) does not meet the moderate or lower threshold level which is required for a deployment decision. Hence, the relatively low acceleration value measured by sensor 26 and the high acceleration value(s) measured by sensors 18–24 results in a non-deployment decision (e.g., controller 14 does not activate any of the assemblies 28–34), as illustrated in functional block or step 98.

By requiring data 64 to meet a "moderate" threshold or level after data 62 has reached a "high" level or value, system 10 utilizes sensor 26 to assist sensors 18–24 in discriminating between "deployment" type impacts and "non-deployment" type impacts. Hence, system 10 provides for improved discrimination over prior systems which include only door-mounted sensors, and allows for relatively minor impacts which directly impact the doors of the vehicle to occur without unnecessary activation of the restraint assemblies 28–34. System 10 therefore allows sensors 18–24 to be "set" or calibrated at a relatively more "sensitive" level, while substantially and desirably reducing the likelihood of an unnecessary deployment or activation of any of the restraint assemblies 28–34 relative to prior systems.

Figure 5:
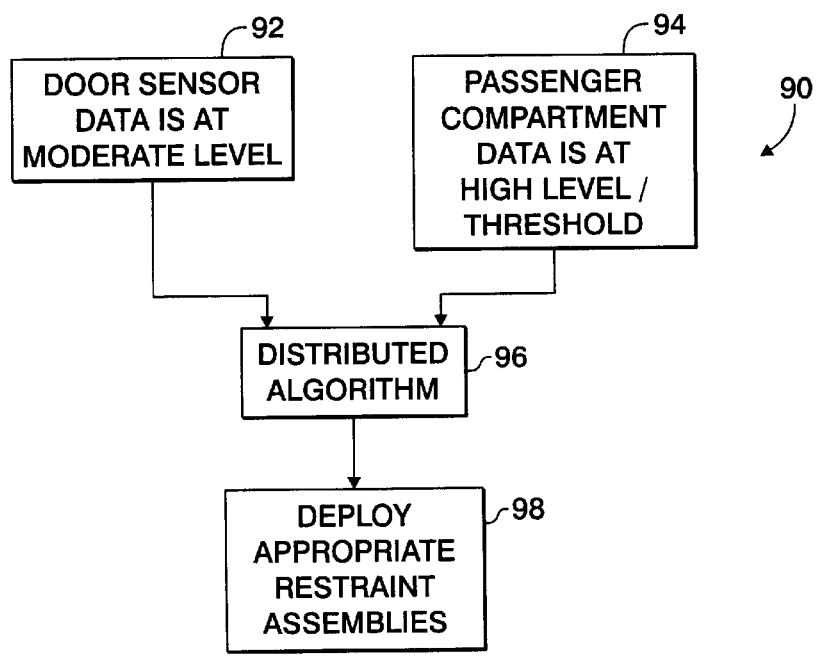
FIG. 5 is a block diagram illustrating a second type of deployment decision made by the system shown in FIG. 1.

Referring now to FIG. 5, there is shown a flow chart or flow diagram 90 illustrating a deployment decision made by the "distributed" algorithm performed by controller 14. As shown in functional block or step 94, controller 14 receives data from sensor 26 (i.e., data 64) which corresponds to a high level of acceleration (e.g., an acceleration measurement exceeding or approaching a predetermined threshold value) in the passenger compartment of the vehicle and which is indicative or representative of a side impact collision. In functional block or step 96, controller 14 analyzes the data 64 in combination with data from "door-mounted" sensors 18–24 (e.g., data 62) in order to more accurately make a deployment/non-deployment decision. As shown in functional block or step 92, in this non-limiting example, the data from sensors 18–24 corresponds to a moderate level or value of lateral acceleration measured within the passenger compartment 52. In the preferred embodiment of the invention, after receiving the high acceleration value or "deployment" signal from sensor 26, controller 14 further ensures that the door-mounted sensor data (e.g., data 64) meets a moderate or lower threshold level or value prior to deploying any of restraint assemblies 28–34. In one non-limiting embodiment, the value of this moderate or lower threshold level is a "dynamic" threshold value (e.g., the threshold value is a function of the acceleration values measured by sensor 26). As illustrated by functional block or step 98, the moderate acceleration measured by sensors 18–24 and the high acceleration value measured by sensors 26 results in the deployment of one or more of assemblies 28–34 (e.g., controller 14 communicates a signal to any one or more of the assemblies 28–34, thereby activating the assemblies and protecting the occupants of vehicle 12).

Figure 6:
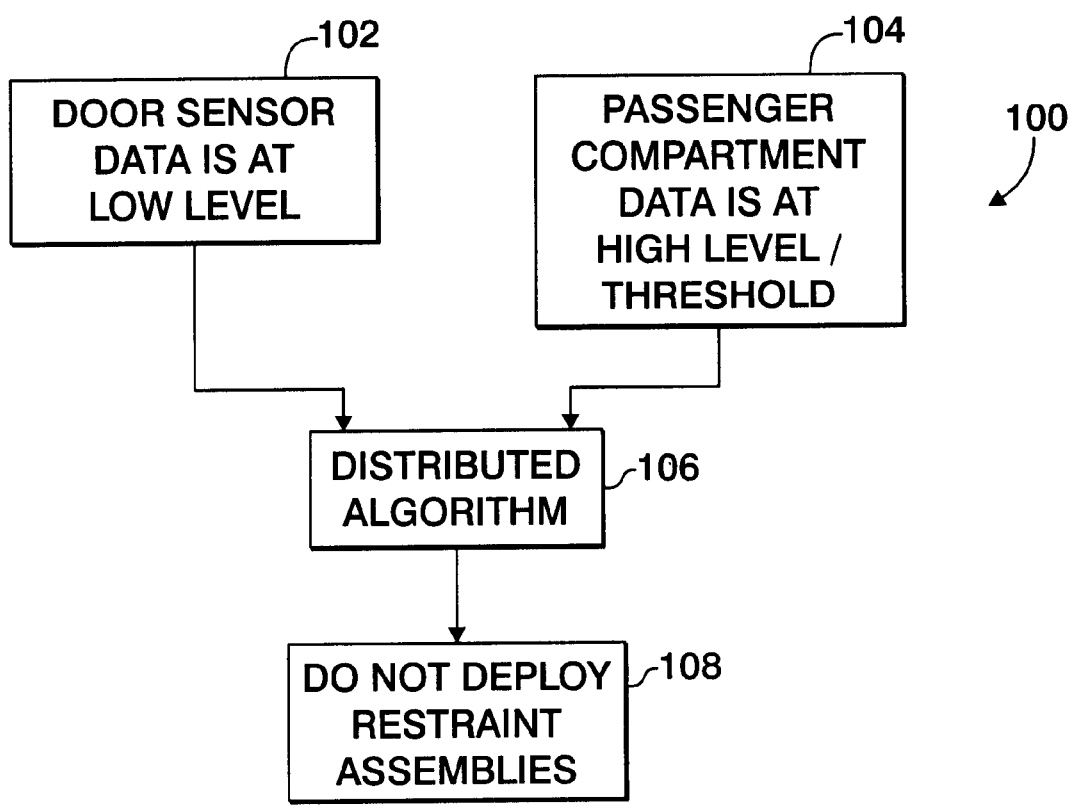
FIG. 6 is a block diagram illustrating a second type of non-deployment decision made by the system shown in FIG. 1.

Referring now to FIG. 6, there is shown a flow chart or flow diagram 100 illustrating a non-deployment decision made by the "distributed" algorithm performed by controller 14. As shown in functional block or step 104, controller 14 receives data from sensor 26 (e.g., data 64) which corresponds to a high level of acceleration (e.g., an acceleration measurement exceeding or approaching a predetermined threshold value) within the passenger compartment 52 and which is indicative or representative of a side impact collision. In functional block or step 106, controller 14 analyzes the data 64 in combination with data from sensors 18–24 (i.e., data 62) in order to accurately make a deployment/non-deployment decision. As shown in functional block or step 102, in this non-limiting example, the data from sensors 18–24 corresponds to a low level or value of lateral acceleration measured at the doors of vehicle 12. In this non-limiting example, the data from sensors 18–24 (e.g., data 62) does not meet the moderate or lower threshold level or value which is required for a deployment decision. Hence, when processed by the controller algorithm, the relatively low acceleration value measured by sensors 18–24 and the high acceleration value(s) measured by sensor 26 results in a non-deployment decision (e.g., controller 14 does not activate any of the assemblies 28–34)

By requiring data 64 to meet a "moderate" threshold or level after data 62 has reached or exceeded a "high" level or value, system 10 utilizes sensor 18–24 to assist sensor 26 in discriminating between "deployment" type impacts and "non-deployment" type impacts. Hence, system 10 provides for improved discrimination over prior systems which include only a passenger compartment sensor. Furthermore, because system 10 utilizes sensors 24–28 to assist sensor 26 in discriminating between "deployment" and "non-deployment" type collisions, the "sensitivity" of the sensor 26 can be lowered or decreased and/or the threshold value(s) used to determine whether such a "non-door collision" has occurred may be desirably raised. In this manner, sensors 18–24 and sensor 26 synergistically and cooperatively reduce the likelihood of false or unnecessary deployment of the vehicle's restraint assemblies, while continuing to achieve timely and proper deployment of the restraint assemblies in a severe collision.

It should be appreciated that in other alternate embodiments, flow diagrams 70, 80, 90 and 100 may include additional steps and/or procedures. In one non-limiting embodiment, each of the thresholds used by controller 14 to determine whether a side impact collision has occurred are "dynamic" thresholds, and may be functions based upon one or more vehicle operating conditions and/or other data received from various other vehicle sensors and systems.

It is understood that the various inventions are not limited to the exact construction illustrated and described above, but that these previously delineated inventions may be varied without departing from the scope of the inventions as described in the following claims.

What is claimed is:

1. A system for detecting a side impact collision to a vehicle and for activating a safety device in response to said detection, said vehicle including at least one door and a passenger compartment, said system comprising:
    at least one first sensor which is mounted to said door, which measures a first lateral acceleration value, and which generates a first signal representing said measured first lateral acceleration value;
    at least one second sensor which is mounted within said passenger compartment, which measures a second lateral acceleration value, and which generates a second signal representing said measured second lateral acceleration value;
    a selectively activatable safety device; and
    a controller having a certain acceleration threshold and which is communicatively coupled to said at least one first sensor, to said at least one second sensor, and to said selectively activatable safety device, said controller being effective to receive said first signal and said second signal, and apply a distributed algorithm which dynamically varies said acceleration threshold, and based upon said dynamically varied acceleration threshold, to detect whether a side impact collision has occurred and to selectively activate said safety device in response to said detection.

2. The system of claim 1 wherein said safety device comprises a side impact air bag.

3. The system of claim 1 wherein said vehicle passenger compartment comprises a center portion and wherein said at least one second sensor is disposed in relative close proximity to said center portion.

4. The system of claim 1 wherein said at least one first sensor comprises an accelerometer.

5. The system of claim 4 wherein said at least one second sensor comprises an accelerometer.

6. The system of claim 1 wherein said controller detects whether a side impact collision has occurred by comparing said first signal to a first threshold value and by comparing said second signal to a second threshold value.

7. The system of claim 6 wherein said first and said second threshold values are dynamic threshold values.

8. A system for detecting a side impact collision to a vehicle including a plurality of doors and a passenger compartment having a tunnel portion, said system comprising:
    a plurality of first lateral acceleration sensors, each of said plurality of first sensors being disposed upon a unique one of said plurality of doors, said plurality of first sensors being effective to measure side impact acceleration data and to generate a plurality of first signals in response to said measured impact data,
    a second lateral acceleration sensor mounted within said passenger compartment in relative close proximity to said tunnel portion, said second lateral acceleration sensor being effective to measure a lateral acceleration of said vehicle and to generate a second signal in response to said measurement; and
    controller having a certain acceleration threshold and which is and which is communicatively coupled to said plurality of first lateral acceleration sensors and to said second lateral acceleration sensor, said controller being effective to receive said plurality of first signals and said second signal, and apply a distributed algorithm which dynamically varies said acceleration threshold, and based upon said plurality of first signals, said varied acceleration threshold, and said second signal, to determine whether a side impact collision has occurred.

9. The system of claim 8 wherein said impact data comprises lateral acceleration values.

10. The system of claim 8 wherein said plurality of sensors comprises one or more structural deformation sensor.

11. The system of claim 8 further comprising:
    a plurality of selectively inflatable side air bag assemblies; and
    wherein said controller is further effective to selectively cause at least one of said plurality of selectively inflatable side air bag assemblies to inflate when A side impact collision has occurred.

12. A method for sensing a side impact collision to a vehicle having a plurality of doors and a passenger compartment having a driver seat and a passenger seat, said method comprising the steps of:
    providing at least one first sensor disposed at a unique one of said plurality of doors;

providing at least one second lateral acceleration sensor disposed within said passenger compartment between said driver seat and said passenger seat;

providing at least one inflatable restraint assembly;

setting a first acceleration threshold; and monitoring said at least one first sensor and said at least one second sensor and applying a distributed algorithm which dynamically varies said first acceleration threshold and utilizing said varied acceleration threshold to determine whether a side collision is occurring, and selectively activating said at least one inflatable restraint assembly in response to said determination.

13. The method of claim 12 wherein said at least one first sensor comprises an accelerometer.

14. The method of claim 13 wherein said at least one first sensor is mounted upon at least one of said plurality of doors.

15. The method of claim 12 wherein said vehicle further includes a control module contained within said passenger compartment, and wherein said at least one second sensor is disposed within said control module.

16. The method of claim 12 wherein said at least one first sensor comprises a structural deformation sensor.

* * * * *